Dec. 9, 1952                  M. MERCIER                  2,621,229
MEANS FOR COMPARING OR MEASURING THE CONSTANTS
OF ELECTRIC CIRCUIT ELEMENTS
Filed Feb. 26, 1948

INVENTOR
MARC MERCIER
BY
Haseltine, Lake & Co,
AGENTS

Patented Dec. 9, 1952

2,621,229

UNITED STATES PATENT OFFICE 2,621,229

MEANS FOR COMPARING OR MEASURING THE CONSTANTS OF ELECTRIC CIRCUIT ELEMENTS

Marc Mercier, Paris, France

Application February 26, 1948, Serial No. 11,228
In France January 9, 1942

Section 1, Public Law 690, August 8, 1946
Patent expires January 9, 1962

3 Claims. (Cl. 175—183)

The present invention relates to circuit arrangements and means for the measurement of electric magnitudes.

More specifically the invention is directed to the provision of combinations of circuits, e. g. electric discharge circuits, which make it possible to compare or measure the inductance in electric circuits.

The main object of the invention is to provide the element to be measured as a component part of an oscillatory circuit and to render the measurements or comparisons simultaneously rapid, practical and commercial in character, while also to increase the sensitivity and to maintain accuracy in said measurements.

Another object of the invention is to provide means for effecting a direct reading on the apparatus, without any calculation, of the value of the measured magnitude.

Another object of the invention is to provide that the adjustment of the device may at will be effected by audible or visual means according to convenience.

Another object of the invention is to provide a dial graduation for the scale of the magnitude to be measured, which is adapted to be engraved beforehand.

Another object of the invention is to provide a measuring circuit of the type described, wherein the influence of the distributed capacitance is negligible.

Another object of the invention is to provide a measuring device of the character described which allows to effect very rapid and accurate measurements on series of elements having approaching values, with a direct reading of the percentage deviation with reference to an element selected as standard or reference.

A further object of the invention is to provide a measuring device of the character described which allows to compare very rapidly, sensitively and accurately the damping of the circuits subjected to measurements, and thereby to ascertain the quality thereof or detect any defects therein.

Other objects, features and advantages of the invention will appear from the ensuing disclosure.

Various forms of embodiment of the invention are illustrated in the accompanying drawings given merely by way of example and not of limitation and wherein:

Fig. 1 illustrates in block-schematic showing a form of the invention more particularly adapted for use in measuring inductances.

Fig. 2 illustrates a wiring diagram of the device more specifically adapted for measuring inductances and whereof the block-diagram is indicated in Fig. 1.

Fig. 1 schematically illustrates in block-diagram form a device designed for the measurement of an induction coefficient $Lx$.

For this purpose, the inductance $Lx$ is connected across a capacitor assembly which comprises a fixed capacitor $C$, an adjusting capacitor $C2$ and a vernier capacitor $C1$ and forms an oscillatory circuit $B$ therewith. Said fixed capacitor $C$ is, according to the invention, selected at a high capacitance value so that with respect thereto the distributed capacitance of the inductance to be measured and of the connections thereof will be negligible. A small resistance $r$ is arranged in series with the inductance $Lx$ to receive from the oscillator $O$ the necessary energy to generate oscillations in the oscillatory circuit $B$. Across the oscillatory circuit $B$ there is arranged a detecting and amplifying unit $DA$ the output of which may supply either an audio-receiver $T$ or a rectifier and an indicating instrument $E$.

The operation of the device will then easily be understood:

The inductance $Lx$ will impose on the oscillatory circuit formed by said inductance itself and the capacitance $Co = C + c1 + c2$ a certain wave length value $\lambda$. When the oscillator $O$ is tuned to said wave length, the oscillatory circuit $B$ is energized and the audio-receiver $T$ will emit a tone signal, because the oscillator $O$ is modulated by a modulator $H$, and the indicating instrument $E$ will show a deviation, which will reach a maximum value for a $\lambda$-value such that $\lambda = 2\pi\sqrt{LxCo}$ wherein:

$Co$ is a constant, since
$C$ is a constant,
$c1$ in this measurement is maintained at a constant value equal to one half the maximum value and
$c2$ is a constant.

It will thus be seen that we may write $$\lambda = K\sqrt{Lx}$$

wherein $K$ is a constant. It is therefore possible to calibrate the dial $M$ of the oscillator $O$ directly in inductance values and the apparatus can thus provide a direct reading, the device for ascertaining the maximum being at will an optical or an acoustical one. Any known device of the "threshold" type may be used in the amplifier detector unit DA to increase the acuteness of the maximum as much as may be desired. For the measurement of Lx, the capacitor $c1$ is adjusted to its intermediate or center value.

Should it now be desired to check the uniformity of a factory production, and specifically to measure the percentage deviation from one inductance element to a standard one or the first one in the production, it will simply be necessary without altering the adjustment of the dial M in the oscillator O, to replace the first inductance $Lx0$ by another one $Lx1$ and adjust the capacitor $c2$ so as to observe a maximum indication in the instruments T or E.

If the dial of the capacitor $c1$ is calibrated in scale calibrations, each corresponding for instance to $$\frac{C+c1+c2}{100}$$

on each side of the middle zero position, then:

If the capacitor $c1$ shows an increase of two calibrations, the inductance $Lx1$ is 2% smaller than the inductance $Lx0$, and If the capacitor $c1$ shows a decrease of two graduations, the inductance $Lx1$ is 2% larger than the inductance $Lx0$ in correspondence with the equation: $LxCo = \text{constant} = K\lambda$.

Fig. 2 illustrates by way of example and not of limitation an electric wiring diagram of a device according to the invention for inductance measurements, already shown in block schematic form in Fig. 1 and which will now enable a more detailed description of some features of the invention to be made. The sources of electric power supply which may either comprise batteries or supply devices from the direct or alternating current network will be so designed as to provide a highly stable supply voltage. In Fig. 2 said sources have not been shown. The negative polarity of the high voltage source is assumed to be connected with the earth or ground of the apparatus. The filaments $f1$, $f2$, $f3$, $f4$ of the tubes V1, V2, V3, V4 are connected with heating circuits not shown. The oscillator O should be very stable in frequency. For this purpose, it may be formed for example of a triode V2 connected with the terminals of an oscillatory circuit comprising for instance a variable capacitor M and inductances such as $a$, $b$; the cathode connection is effected through the common point of the inductances such as $a$ and $b$. The grid resistance 7 is short-circuited with respect to high frequency currents by the capacitor 8. A modulator H comprises for instance a triode V1 and a large air-gap iron core carrying the inductances 2 and 3 respectively tuned to the desired and audio-frequencies by means of the capacitors 1 and 6. The capacitor 6 moreover shunts the anode of the tube V2 with earth for the high frequencies produced by the oscillator O. The resistor 4 forms the grid resistor for the oscillator H. By placing this resistor preferably in the cathode circuit, it is possible, by adjusting its value, to control the degree of modulation, and the counter-feed-back thus produced, is effective to eliminate harmonics. The potentiometer system formed by the three resistors 9, 10 and 11 provides for the anode supply for the oscillators H and O and the variable tap P makes it possible to adjust the magnitude of the modulated oscillations supplied from the oscillator O. However, the just described potentiometer system can be replaced by a series resistance. The capacitor 12 forms part of the supply filter circuit. The capacitor 5 provides for short-circuiting the potentiometer or resistance for audio-frequencies.

The above described circuit arrangement makes it possible to ensure that the oscillator O will have a constant degree and frequency of modulation.

The energy supplied from the oscillator O is picked up through a winding such as $d$ which is coupled to an inductance $b$. Various sets of inductances such as $a1$, $b1$, $d1$; $a2$, $b2$, $d2$, etc. may be substituted for the inductances $a$, $b$, $d$, so as to make available the desired number of frequency ranges. For this purpose, a switch provided with contacts 14, 15, 16, 17 is provided for switching from one set for inductances to another, while the movable contact 13 is adapted to earth those inductances which are not in use. All the circuits comprising the oscillator O and the circuits B are enclosed in a shielding structure not shown and thermally insulated from all of the heat-generating portions of the apparatus, so as to ensure constancy in the measurements. It may be of interest to note:

1. That an additional inductance $l$ may be incorporated in the apparatus in series with $Lx$, and the sum total of the residual inductances of the apparatus together with this additional inductance is, by suitable adjustment, caused to assume a constant value, the scale graduation of the dial M being displaced in a suitable direction by the amount of this value, whereby $Lx$ may be measured down to values as low as zero.

2. Through the use of a switch it becomes possible to alter the operating conditions of the cathode circuit so as to vary the character of the high-frequency detector, in order to operate the detector out of saturation conditions, and also to alter the sensitiveness of the apparatus in the case of inductances $Lx$ having widely differing surtension coefficients.

3. The audio-detector T may be supplied from an individual tube.

The line 18 having a very low impedance, transmits the high frequency energy to the oscillatory circuit B comprising the inductance $Lx$ which it is desired to measure. Said oscillatory circuit B comprises a fixed capacitor C of relatively high value, $6/1000$ $\mu F$ by example, so as to cause any distributed capacitance to be negligible, an adjusting condenser C2 and the vernier condenser C1 having a zero intermediate position. Across the terminals of said oscillatory circuit B there is connected the pentode V3 through capacitor 19 and resistor 20 for forming the detector D.

The resistor 24 shunted by the condenser 23 supplies the screen grid, and the resistor 25 forms the anode circuit. The capacitor 26 transmits the detected frequency to the amplifier A comprising the tube V4, the cathode of which is biassed through a resistor 29 shunted by the capacitor 28 and the grid of which is provided with a leak resistor 27. The anode circuit of said tube comprises in series an inductance 30 and the audio-receiver 31, adapted to be short-circuited through the switch 32. The capacitor 33 transmits the amplified audio-currents to the indicating instrument E comprising a rectifier 34 and a galvanometer 35. The above described device operates as follows:

The inductance $Lx$ to be measured is arranged across the terminals 21, 22 of the oscillatory circuit B. The dial of the capacitor C1 is set to zero position, corresponding to the capacitance value $$\frac{c_1}{2}$$

The particular range of the switch 14, 15, 16, 17 in which the oscillator O may be caused to resonate with the circuit B, is found by rotating the variable capacitor M until a maximum indication is reached either in the audio-receiver T or in the galvanometer 35. As previously indicated, by virtue of the equation: $\lambda = 2\pi\sqrt{L_x C_o}$, the dial M is provided with a scale graduation directly calibrated in values of $L_x$. There will be as many such scales as there are sets of inductances such as a, b, d, that is, as there are ranges in the oscillator O. The capacitor $c_2$ is an adjusting element enabling adjustment of the value $C_o = C + c_r + \frac{1}{2}c_1 + c_2$, wherein $c_r$ is the total residual capacity of the circuit B, to a constant value, in each individual apparatus. The capacitor $c_1$ is calibrated about a central position of its dial marked as "zero," in percentages of the total capacity $C_o$.

If now it is desired to compare various inductances such as $L_{x_1}$, $L_{x_2}$ and so on, to an inductance $L_o$ in the same range of values, taken as a standard or reference, the operation is as follows:

1. The inductance $L_o$ is placed across the terminals 21—22.
2. The capacitor $C_1$ is set to the zero calibration.
3. The oscillator O is adjusted as previously indicated, that is for instance it is so adjusted that the deviation of the galvanometer 35 will be a maximum; then the value of $L_o$ is read on the dial M corresponding to a wave length $\lambda_o$ of the oscillator O.
4. The inductance $L_o$ is replaced by the inductance $L_{x_1}$ and, without actuating the dial M, the dial of the capacitor $C_1$ is rotated until a maximum deviation is obtained in the galvanometer 35.

A reading is then made on the calibrated dial of the capacitor $C_1$. This reading then provides the percentage deviation of the inductance $L_{x_1}$ with respect to the inductance $L_o$. This deviation is negative if $c_1$ has been increased and it is positive if $c_1$ was reduced, with reference to the equation:

$$\lambda_o = \text{constant} = 2\sqrt{L_o C_o} = 2\pi\sqrt{L_x C_x}$$

wherein $C_x = C + c_2 + c_r + c_{1x}$ ($c_{1x}$ being the new value of $c_1$).

Moreover, the reading of the maximum deviation on the scale of the galvanometer 35 makes it possible to compare the qualities of the inductances $L_o$, $L_x$, etc., of approaching values, if the power output supplied by the modulated oscillator O—H and the sensitivity of the detector D, amplifier A and reading device E have remained constant from one measurement to the next, this assumption being in fact accurate, in practice, if the various measurements are effected at short time intervals between each other and if the supply voltage of the various elements of the device have remained constant.

The last-mentioned characteristic of the device makes it possible to ascertain any variation in the damping characteristics, that is in practice, immediately to detect, inter-alia, if one or more strands in a multiple wire is or are cut, or if there are any winding turns in short-circuit, or any defective soldered connections, or defective insulating supports, or capacitor with defective clamps (by arranging them in series with $L_x$).

It will of course be understood that other forms of embodiments of the invention may be constructed, and that various modifications may be made in the above described arrangements, for instance by replacing various electron discharge tubes by multi-electrode tubes or altering the circuit arrangements, without exceeding the scope of the invention.

In particular, the oscillator O could be a non-modulated one and the detector-amplifier DA could then comprise an amplifier, a detector and a suitable direct-current amplifier.

What I claim is:

1. An apparatus for measuring the inductances of electric circuit elemnts comprising, in combination, a modulator; a tunable oscillator supplied by said modulator and having an adjusting device the scale of which is directly calibrated in inductance values; a coupling oscillatory circuit including a circuit element the inductance of which is to be measured and an open oscillatory circuit having a resistor coupled to said oscillator and one end of which is connected to one end of said circuit element, and a set of capacitors having one side connected to the other end of said circuit element and the other side connected to the other end of said resistor, said capacitors being mounted in parallel in said set and comprising a fixed capacitor having a high capacitance value for rendering negligible with respect to its own capacitance the distributed capacitance of said circuit element, and an adjustable capacitor assembly the capacitance of which is previously adjusted to the value of the difference existing between a predetermined capacitance value and the sum of the total residual capacity of said open oscillatory circuit and of the capacitance of said fixed capacitor whereby owing to the constancy of said predetermined capacitance value, a direct reading of the inductance may be made without any computing operation on the scale of said adjusting device, for resonance between said oscillator and said oscillatory circuit; means for detecting the modulated oscillations issued from said oscillatory circuit; and means for indicating the intensity of the thus detected audio-current, the thus obtained modulations giving after detection a large, simple and stable amplification.

2. An apparatus for measuring the inductances of electric circuit elements comprising, in combination, a modulator; a tunable oscillator supplied by said modulator and having an adjusting device the scale of which is directly calibrated in inductance values; a coupling oscillatory circuit including a circuit element the inductance of which is to be measured and an open oscillatory circuit having a resistor coupled to said oscillator and one end of which is connected to one end of said circuit element, and a set of capacitors having one side connected to the other end of said circuit element and the other side connected to the other end of said resistor, said capacitors being mounted in parallel in said set and comprising a fixed capacitor having a high capacitance value for rendering negligible with respect to its own capacitance the distributed capacitance of said circuit element, an adjustable vernier capacitor having a scale the "Zero" value of which corresponds to the position of said vernier capacitor for which its capacitance is equal to one half the maximum value thereof, said scale being so designed as to indicate percentage deviations with respect to said mid-capacitance value, and an adjustable capacitor the capacitance value of which is previously adjusted to the value of the difference existing between a predetermined capacitance value and the sum of the total residual capacity of the open oscillatory circuit and of the capacitances of the fixed capacitor and of the vernier capacitor adjusted on said "Zero" value, whereby owing to the constancy of said predetermined capacitance value, a direct reading of the inductance may be made without any computing operation on the scale of said adjusting device, for resonance between said oscillator and said oscillatory circuit; means for detecting the modulated oscillations issued from said oscillatory circuit; and means for indicating the intensity of the thus detected audio-current, the thus obtained modulations giving after detection a large, simple and stable amplification, said vernier capacitor remaining at said "Zero" value when measuring the inductance of one electric circuit element and being adjusted for determining in percentage the relative inductance values of a plurality of circuit elements to be compared with said circuit element by direct reading on its own scale.

3. An apparatus for measuring the inductances of electric circuit elements comprising, in combination, a modulator; a tunable oscillator supplied by said modulator and having an adjusting device the scale of which is directly calibrated in inductance values; a coupling oscillatory circuit including a circuit element the inductance of which is to be measured and an open oscillatory circuit having a resistor coupled to said oscillator and one end of which is connected to one end of said circuit element, and a set of capacitors having one side connected to the other end of said circuit element and the other side connected to the other end of said resistor, said capacitors being mounted in parallel in said set and comprising a fixed capacitor having a high capacitance value for rendering negligible with respect to its own capacitance the distributed capacitance of said circuit element, and an adjustable capacitor assembly the capacitance of which is previously adjusted to the value of the difference existing between a predetermined capacitance value and the sum of the total residual capacity of said open oscillatory circuit and of the capacitance of said fixed capacitor, whereby owing to the constancy of said predetermined capacitance value, a direct reading of the inductance may be made without any computing operation on the scale of said adjusting device, for resonance between said oscillator and said oscillatory circuit; means for detecting the modulated oscillations issued from said oscillatory circuit; means for indicating the intensity of the thus detected audio-current, the thus obtained modulations giving after detection a large, simple and stable amplification; and an additional adjustable inductance mounted in series with the circuit element, said additional inductance being previously adjusted so that the sum of its own inductance and of the residual inductance of the oscillatory circuit reaches a constant value, the scale of the adjusting device being displaced in a suitable direction by the amount of this constant value, whereby the inductance of the circuit element may be measured down to values as low as zero.

MARC MERCIER.

REFERENCES CITED

The following references are of record in the file of this patent:

UNITED STATES PATENTS

| Number | Name | Date |
|---|---|---|
| 1,971,310 | Barber | Aug. 21, 1934 |
| 2,091,109 | Shiepe | Aug. 24, 1937 |
| 2,137,787 | Snow | Nov. 22, 1938 |
| 2,337,759 | Loughlin | Dec. 28, 1943 |
| 2,367,965 | Rushing | Jan. 23, 1945 |

FOREIGN PATENTS

| Number | Country | Date |
|---|---|---|
| 542,050 | Great Britain | Dec. 23, 1941 |

OTHER REFERENCES

Hund; High - Frequency Measurements; McGraw-Hill Book Co., 1933, pp. 50, 51, 52, 218, 219, 245, 246.

Radio World, July 1936, pp. 45–51.